(12) United States Patent
Ergen et al.

(10) Patent No.: US 8,452,477 B2
(45) Date of Patent: May 28, 2013

(54) METHOD AND SYSTEM FOR MANAGING DATA TRANSMISSION FROM A PLURALITY OF SENSOR DEVICES INCLUDED IN A TYRE

(75) Inventors: Sinem Coleri Ergen, Berkeley, CA (US); Xuening Sun, Berkeley, CA (US)

(73) Assignee: Pirelli Tyre S.p.A., Milan (IT)

( * ) Notice: Subject to any disclaimer, the term of this patent is extended or adjusted under 35 U.S.C. 154(b) by 348 days.

(21) Appl. No.: 12/809,537

(22) PCT Filed: Dec. 20, 2007

(86) PCT No.: PCT/IT2007/000901
§ 371 (c)(1),
(2), (4) Date: Dec. 17, 2010

(87) PCT Pub. No.: WO2009/081425
PCT Pub. Date: Jul. 2, 2009

(65) Prior Publication Data
US 2011/0087396 A1 Apr. 14, 2011

(51) Int. Cl.
*G01M 17/00* (2006.01)

(52) U.S. Cl.
USPC ....... 701/29.1; 701/29.6; 701/31.2; 701/32.2; 701/33.6; 340/442; 340/443; 340/444; 340/445; 340/446

(58) Field of Classification Search
USPC .......... 701/29.1, 29.6, 33.6, 31–35; 340/445, 340/442, 447, 443, 444, 446, 448
See application file for complete search history.

(56) References Cited

U.S. PATENT DOCUMENTS

| 6,292,096 B1* | 9/2001 | Munch et al. | 340/445 |
|---|---|---|---|
| 6,486,773 B1* | 11/2002 | Bailie et al. | 340/445 |
| 7,443,301 B2* | 10/2008 | Tucker et al. | 340/572.8 |
| 7,738,413 B2* | 6/2010 | Varaiya et al. | 370/321 |
| 7,769,510 B2* | 8/2010 | Denholm et al. | 701/29.6 |
| 2005/0122231 A1* | 6/2005 | Varaiya et al. | 340/870.01 |
| 2011/0087396 A1* | 4/2011 | Eregen et al. | 701/29 |

FOREIGN PATENT DOCUMENTS

| DE | 103 57 922 A1 | 7/2004 |
|---|---|---|
| EP | 1 108 568 A2 | 6/2001 |
| EP | 1 484 200 A2 | 12/2004 |
| EP | 1 536 392 A1 | 6/2005 |
| EP | 1 826 029 A1 | 8/2007 |
| WO | WO-03/082644 A1 | 10/2003 |
| WO | WO-2004/030950 A1 | 4/2004 |
| WO | WO-2005/043106 A1 | 5/2005 |
| WO | WO-2005/067073 A1 | 7/2005 |
| WO | WO-2006/034731 A1 | 4/2006 |

OTHER PUBLICATIONS

International Search Report from the European Patent Office for International Application No. PCT/IT2007/000901 (Mail date Aug. 4, 2008).

* cited by examiner

*Primary Examiner* — Redhwan K Mawari
(74) *Attorney, Agent, or Firm* — Finnegan, Henderson, Farabow, Garrett & Dunner, L.L.P.

(57) ABSTRACT

Wireless transmission from sensor devices included in tires is coordinated by a receiving unit associated with the tire, or transmission coordinator. In more detail, every sensor device is made aware of an overall time window available for transmission, and based on at least this information, it calculates a dedicated timeslot for the transmission of its data within such time window. This coordinated transmission makes possible a strong reduction of the probability of collisions and transmission errors, and reduces the number of transmissions, so as to comply with the limited power resources available at each sensor device.

29 Claims, 5 Drawing Sheets

METHOD AND SYSTEM FOR MANAGING DATA TRANSMISSION FROM A PLURALITY OF SENSOR DEVICES INCLUDED IN A TYRE

CROSS REFERENCE TO RELATED APPLICATION

This application is a national phase application based on PCT/IT2007/000901, filed Dec. 20, 2007.

FIELD OF THE INVENTION

The present invention relates to a method and a system for managing transmission of data measured by a plurality of sensors included in a tyre fitted on a vehicle. Said sensors could comprise for example accelerometers, and/or strain gauges, and/or pressure sensors, and/or temperature sensors.

BACKGROUND OF THE INVENTION

The incorporation of electronic devices within pneumatic tyres is taking a greater importance in order to increase safety of vehicles. Tyre electronics may include sensors and other components suitable for obtaining information regarding the behavior of a tyre, as well as various physical parameters thereof, such as for example temperature, pressure, number of tyre revolutions, vehicle speed, etc. Such information may become useful in tyre monitoring and/or alarm systems. Furthermore, active control systems of the vehicle may be based on information sent from sensor devices included within the tyres.

Integrated tyre electronics systems have conventionally been powered by a variety of techniques and different power generation systems.

A typical solution for powering tyre electronics systems is the use of a non-rechargeable battery, which may cause inconveniences to a tyre user since proper electronics system operation is dependent on periodic battery replacement. As a matter of fact, batteries tend to deplete their energy storage quite rapidly when powering electronic applications characterized by complex levels of functionality. Furthermore, conventional batteries typically contain heavy metals that are not environmentally friendly and which present disposal concerns. Moreover, performances of conventional batteries are often influenced by temperature: in particular, the functioning of such batteries is not reliable at low temperatures.

Another known method for powering tyre monitoring systems is a coupling of radio-frequency (RF) power between an antenna disposed on the vehicle in close proximity with another antenna included within the electronic device disposed in the tyre. This typically requires antennas disposed in vehicle portions frequently exposed to damage from road hazards, and thus may lead to many drawbacks.

The use of energy scavenging or harvesting elements, e.g. based on piezoelectricity, has also been proposed for powering tyre monitoring systems. Piezoelectricity is a property of certain materials, such as quartz, Rochelle salt, and certain solid-solution ceramic materials such as lead-zirconate-titanate (PZT), of generating electrical charge when mechanically stressed.

For example, WO 2005/067073 discloses a tyre comprising a piezoelectric flexing element associated with an energy storage device (e.g. a capacitor). The piezoelectric flexing element is mounted in cantilever fashion in a housing so as to be positioned substantially along a plane orthogonal to a radial direction of said tyre and, so that a first end of the piezoelectric element is restrained to the housing. A loading mass is coupled to the second end of the piezoelectric flexing element. A small gap is formed between the inner walls of the housing and the outer surface of the loading mass, in order to allow limited flexure of the piezoelectric element. The housing including the piezoelectric element is mounted in a tyre portion in correspondence of a tread area of the tyre, preferably on the inner surface of the tyre. The piezoelectric element flexes under the action of the radial acceleration when the tyre rotates. The loading mass and the gap are chosen to obtain: a) small entity oscillations of the flexure element substantially during a complete revolution of the tyre, when the tyre rotates at low speed; b) large entity oscillations of the flexure element substantially only during the passage of the tyre portion including the piezoelectric element in the contact patch.

Typically, wireless transmission is employed in order to send tyre performance information outside the tyre, to a receiver disposed on the vehicle body, so that electronic devices disposed within a wheel typically include a transmitter associated to an antenna.

EP 1484200 relates to a communication system for communicating between a tire/wheel assembly and a vehicle body, which is provided with a wheel-side communication device mounted to the wheel and which rotates together with the wheel, and a body-side communication device mounted in a fixed position to the vehicle body. Communication takes place between the wheel-side communication device and the body-side communication device according to the rotational position of the wheel. According to EP 1484200, when one of the wheel-side communication device and the body-side communication device receives a signal from the other, the reception changes cyclically as the wheel rotates. There is a pattern between the change in that reception and the change in the rotational position of the wheel, in which the reception improves when the actual rotational position of the wheel matches a specific rotational position. The system disclosed in EP 1484200 selectively performs communication between the wheel-side communication device and the body-side communication device at a rotational position of a wheel, from among a plurality of rotational positions of the wheel, with the exception of a rotational position where the communication state between the communication devices may be poor. Moreover, the communication system of EP 1484200 may also be provided with: i) a rotational position detecting device that detects a rotational position of the tire/wheel assembly; and ii) a transmission timing determining device that determines a communication timing based on the relationship between the rotational position of the wheel detected by the rotational position detecting device and a received signal level, which is the level of a signal received from one of the body-side communication device and the wheel-side communication device by the other.

In another document, namely EP 1536392, the object of performing a stable function of the system and of increasing the probability of the transmission and reception even in the presence of a dead point, i.e. a point at which the receive intensity does not reach the receive limit, is said to be achieved by a wheel condition monitoring system having a transmitter which is installed on an individual rotatable wheel to transmit a condition of the wheel and a receiver which is installed on the vehicle body side to receive the condition of the wheel sent from the transmitter, wherein the rotation speed of the wheel is detected (e.g. with an accelerometer), and data indicating the condition of the wheel are sent from the transmitter to the receiver at intervals in accordance with the detected rotation speed of wheel. In particular, the system is configured so that transmission is achieved at intervals corresponding to the rotation speed of wheel. Therefore, even if a dead point at which transmission and reception are impossible is present, the probability that transmission and reception can be accomplished by several times of transmission can be increased, and the system can perform its functions stably. More in detail, when the receiver receives a plurality of pieces of data sent from the transmitter installed on each of a plurality of wheels, first data transmission from the transmitter is performed after each waiting time set for each transmitter has elapsed, so that a problem of transmission overlaps with the transmission of electric waves from another wheel in terms of time, can be overcome.

EP1826029 discloses a system in which acquired wheel information, such as temperature data and inflation pressure data, is surely transmitted from a transmitter in a status where the transmitter is not located in a dead space, by controlling timing wherein the transmitter acquires the wheel information, a transmission time width and transmitting timing of the data to be transmitted from the transmitter by radio. In particular, the wheel information acquiring system disclosed in EP 1826029 acquires wheel information of the wheel during rotation, and comprises:

a first communication device that is attached to the wheel and detects wheel information associated with the wheel during rotation, and wirelessly transmits the detected wheel information from a wheel side; and a second communication device that is provided apart from the wheel and that receives and acquires the wheel information transmitted by the first communication device, wherein the first communication device has a maximum value of rotation speed specified for the wheel during rotation to which the first communication device is attached (e.g. comprised in a range between 90 km/h and 300 km/h); and wherein when a transmission time width of one packet of the wheel information transmitted by the first communication device is represented by $T_1$, and an expected minimum rotation period-which is determined according to the maximum value of the rotation speed prespecified in the first communication device is represented by $R_1$, $T_1$ is set so as to satisfy $T_1 \leq R_1 \cdot \frac{1}{2}$, preferably $T_1 \leq R_1 \cdot \frac{1}{12}$.

WO2004/030950 discloses a telemetry unit provided for mounting inside a pneumatic tyre, which includes a piezoelectric element supported in a housing, with an actuator arranged for contact with the element, to deflect the element in response to external forces acting on the actuator during rotation of the tyre. For every rotation of the tyre, cyclic pulses of electrical charge are generated by the deflection of the element. The charge is stored and utilized under a power consumption protocol including the steps of: initiating power to a data measurement circuit for measuring data from the environment local to the unit; disabling power to the data measurement circuit; initiating power to a data transmission circuit; transmitting data from the measurement circuit; and disabling power to the transmission circuit. The power consumption protocol therefore minimizes consumption of the generated power, during measurement and transmission of data by the unit.

EP 1487682 discloses a method for monitoring the behavior of a tyre during running, the method comprising the steps of: acquiring and storing, at least temporarily, a first curve representing the acceleration profile of a first point of the tread area of said tyre, located on a meridian plane of said tyre; acquiring and storing, at least temporarily, at least a second curve representing the acceleration profile of a second point of the tread area of said tyre, located substantially on said meridian plane; comparing said first and second curves, or parameters derived thereof; determining the behavior of said tyre from said comparison.

EP 1676112 discloses a method and a system for determining a cornering angle of a tyre fitted on a vehicle during a running of said vehicle on a rolling surface. The method comprises the steps of: estimating a length of a contact region between said tyre and said rolling surface, said length being measured at a distance from the equatorial plane of the tyre; estimating a load exerted on said tyre; estimating a camber angle to which said tyre is subjected; and deriving such cornering angle from said camber angle, tyre load and contact region length.

EP 1794007 discloses a method and a system for determining a cornering angle of a tyre fitted on a vehicle during a running of said vehicle on a rolling surface. The method comprises the steps of: determining the lateral acceleration of a portion of the tyre tread spaced apart from the equatorial plane of said tyre; determining a rotation speed of said tyre; and determining said cornering angle from said lateral acceleration and said rotation speed, by using characteristic curves of lateral acceleration amplitude versus predetermined values of cornering angle for at least one rotation speed.

SUMMARY OF THE INVENTION

According to the Applicant, a complete tyre sensor system should include a plurality of sensor devices located at predefined positions within a tyre, for the purpose of obtaining a more detailed description of the interaction between the tyre and the ground, which appears to be necessary for implementing reliable vehicle control systems based on information derived from the tyres.

For example, a plurality of accelerometers could be fixed to the inner surface of the tyre and disposed on the same meridian plane of the tyre, in order to derive information related to the length of the contact region between the tyre and the ground in different points of the contact region itself, and/or in order to derive various other parameters, such as the tyre load, the cornering and/or the camber angle to which the tyre is being subjected, the current and the potential friction between the tyre tread surface and the ground, etc.

A reliable collection of data from a plurality of sensor devices included within a tyre should as much as possible avoid collisions between information (typically sent in form of data packets) sent from different sensor devices at the same time. In fact, collisions between packets sent from different sensor devices requires multiple retransmission of the missed packets, and/or multiple transmissions of all the packets from the sensor devices, which appears to be disadvantageous for devices which have a very limited available power. This latter issue becomes even more critical in case of use of energy scavenging components for the powering of the sensor devices, as it may be the case of a tyre integrated sensor system in which use of non-rechargeable and disposal-problematic batteries is refrained.

The Applicant has thus faced the problem of providing a reliable and low power consuming transmission from a plurality of sensor devices included within a tyre.

The Applicant has found that this problem can be solved by coordinating the transmission of the various sensor devices. In more detail, every sensor device is made aware of an overall time window available for transmission, and based on at least this information it calculates a dedicated timeslot for the transmission of its data within such time window. This coordinated transmission makes possible a strong reduction of the probability of transmission errors, and reduces the number of transmissions, so as to comply with the limited power resources available at each sensor device.

In a first aspect, the invention relates to a method for managing transmission of data from a plurality of sensor devices included in a tyre fitted on a vehicle, the method comprising:

providing said plurality of sensor devices at predefined respective positions in said tyre;

providing a transmission coordinator on said vehicle, outside of said tyre;

rotating said tyre and having said plurality of sensor devices obtaining data related to a condition of said tyre during rotation thereof;

causing said plurality of sensor devices to wirelessly transmit the obtained data;

wherein said causing said plurality of sensor devices to wirelessly transmit said obtained data comprises:

sending timing information from said transmission coordinator, said timing information being at least related to a maximum allowed time interval for the transmission of the obtained data from said plurality of sensor devices;

at each sensor device of said plurality of sensor devices, receiving said timing information and calculating at least one respective transmission timeslot for the transmission of the obtained data within said maximum allowed time interval, so as to obtain a respective plurality of non-overlapping transmission timeslots;

at each sensor device of the plurality of sensor devices, waiting for the respective calculated at least one transmission timeslot and wirelessly transmitting the obtained data within the respective calculated at least one transmission timeslot.

In a second aspect, the invention relates to a system for monitoring a tyre fitted on a vehicle comprising:

a plurality of sensor devices being adapted to obtain data related to a condition of said tyre during rotation thereof and to wirelessly transmit the obtained data outside of said tyre;

a transmission coordinator being adapted to receive said obtained data transmitted by said plurality of sensor devices;

wherein said transmission coordinator is further adapted to send timing information to said plurality of sensor devices, said timing information being at least related to a maximum allowed time interval for the transmission of the obtained data from said plurality of sensor devices;

each sensor device of said plurality of sensor devices is further adapted to receive said timing information and calculate at least one respective transmission timeslot for the transmission of the obtained data within said maximum allowed time interval, so as to obtain a respective plurality of non-overlapping transmission timeslots; and each sensor device of the plurality of sensor devices is further adapted to wait for the respective calculated at least one transmission timeslot and to wirelessly transmit the obtained data within the respective calculated at least one transmission timeslot.

The present invention, in at least one of the abovementioned aspects, may comprise one or more of the preferred features hereinafter described.

The maximum allowed time interval is preferably at most equal to a time interval required for one complete revolution of said tyre, more preferably at most equal to a half of said time interval required for one complete revolution of said tyre. This is advantageous for implementing a very precise vehicle control system, which needs information related to the interaction between the tyre and the ground at every tyre revolution.

In preferred embodiments, at least one sensor device is "designated" as master sensor device. The master sensor device is adapted to send idle information being related to a readiness of said plurality of sensor devices to receive said timing information. Moreover, the transmission coordinator is adapted to send said timing information consequently of a reception of said idle information.

Advantageously, each sensor device of said plurality of sensor devices comprises an electrical circuit being adapted to store electrical energy generated in consequence of the rotation of the tyre. The scavenging of energy from the rotation of the tyre allows disposal problems related to the use of batteries in the sensor devices to be avoided.

The master sensor device can be adapted to send said idle information when a voltage across its respective electrical circuit is higher than a predetermined threshold. This allows beginning the coordination of the transmissions from the different sensor devices when the latter ones are ready to operate.

The timing information sent by the transmission coordinator may be also related to a maximum allowed acquisition time interval for the acquisition of data related to a condition of said tyre by the plurality of sensor devices. In such case, each sensor device may organize its acquisition and transmission activities in a very simple and low power-consuming way.

It may be convenient to provide that said maximum allowed acquisition time interval and said plurality of non-overlapping calculated transmission timeslots do not overlap with each other. In such case, no peaks of power are needed, with a possible better overall power management in each sensor device.

The transmission coordinator may be further adapted to process the data received by the sensor devices, so as to derive a condition of said tyre. Suitable processing algorithms could be implemented at the transmission coordinator for deriving various parameters characterizing the behavior of the tyre during rolling.

While the method and the system of the invention try to avoid, as much as possible, the retransmissions from the sensor devices, in exceptional cases the transmission coordinator may be further adapted to address a retransmission request of at least one data portion to at least one sensor device, particularly in case of missed reception of said at least one data portion transmitted from at least one sensor device.

The at least one sensor device may thus further be adapted to retransmit said at least one data portion in consequence of a reception of said retransmission request. The retransmission is performed within the maximum allowed time interval.

The at least one sensor device may be also adapted to calculate a respective retransmission timeslot based on the timing information previously received by the transmission coordinator, and to retransmit said at least one data portion within said respective calculated retransmission timeslot. Preferably, said calculated respective retransmission timeslot and the plurality of non-overlapping transmission timeslots do not overlap with each other, so as to avoid collisions between transmitted packets and retransmitted packets.

In preferred embodiments, the plurality of sensor devices comprises at least two sensor devices disposed substantially at the same meridian plane of the tyre (e.g. the sensor devices may be disposed within a circumferential angle of at most 5°). This allows a very precise monitoring of the contact region between the tyre and the ground.

In more preferred embodiments, each sensor device of said plurality of sensor devices comprises an accelerometer. Said accelerometer may advantageously be adapted to measure acceleration in at least two directions, preferably three directions.

Conveniently, each sensor device of said plurality of sensor devices is fixed to an inner surface of the tyre, which could be simply accomplished, e.g., by using a suitable adhesive.

BRIEF DESCRIPTION OF THE DRAWINGS

Further features and advantages of the present invention will be made apparent by the following detailed description of some exemplary embodiments thereof, provided merely by way of non-limiting examples. The description will make reference to the attached drawings, wherein.

DETAILED DESCRIPTION OF EXEMPLARY EMBODIMENTS OF THE INVENTION

Figure 1:
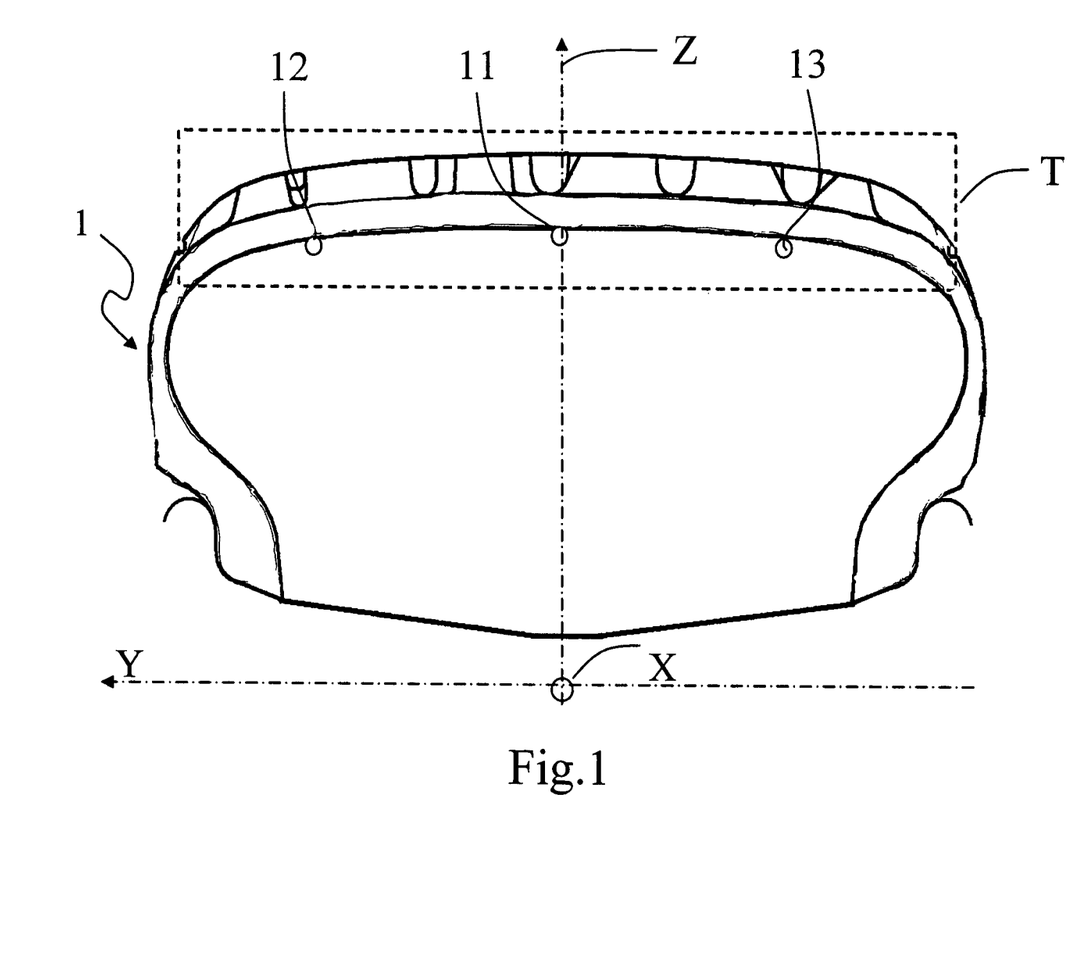
FIG. 1 schematically shows a transverse section of a tyre having three sensor devices disposed on the inner surface of a tyre, usable in a preferred embodiment of the present invention.

FIG. 1 shows an exemplary tyre 1 comprising an internally hollow toroidal structure formed by a plurality of components, primarily by a carcass, terminating in two beads, each formed along an inner circumferential edge of the carcass, for securing the tyre to a corresponding supporting rim (not shown in FIG. 1). The tyre 1 typically comprises at least one pair of annular reinforcing cores, called bead cores, which are inserted in the said beads. The carcass is a supporting structure formed by at least one reinforcing ply which includes textile or metallic cords, axially extending from one bead to the other according to a toroidal profile, the ends of which are associated with a corresponding bead core. In radial tyres, the aforesaid cords lie essentially in planes containing the axis of rotation of the tyre.

In a radially external position to the carcass, an annular structure is placed, known as belt structure, typically comprising one or more strips of rubberized fabric, wound on top of each other. A tread made from elastomeric material, wound around the belt structure, and usually molded with a relief pattern for the rolling contact of the tyre with the road is also added. Two sidewalls, made from elastomeric material, each extending outwards in radial direction from the outer edge of the corresponding bead, are also placed on the carcass, in axially opposed positions.

In tubeless tyres the inner surface of the carcass is normally covered with at least one liner layer, i.e. with one or more layers of airtight elastomeric material. The tyre 1 may further comprise other known elements, such as edges, strips and fillers, according to the specific design of the tyre.

At least two sensor devices comprising sensor components adapted to measure a quantity related to the interaction between the tyre and the ground are disposed substantially along the same meridian plane within the tyre 1. For the purposes of the present invention, by "meridian plane" of a tyre it has to be intended any plane comprising the rotation axis of the tyre. In preferred embodiments, the sensor components could be accelerometers. Strain gauges could also be used in alternative to or in combination with accelerometers. For the purposes of the present invention, the expression "substantially along the same meridian plane" contemplates a certain amount of misalignment of the sensor devices with respect to said meridian plane, that can be expressed in terms of the angle comprised between the meridian planes defined by the sensor device positions. Preferably, the tolerated misalignment may correspond to an angle not greater than 5°, more preferably not greater than 3°, even more preferably not greater than 1°. More particularly, the sensor devices are disposed in correspondence of the crown portion T of the tyre 1, i.e., the portion of the tyre 1 axially extended between the sidewalls of the tyre 1. Preferably, as shown in the embodiment of FIG. 1, at least three sensor devices could be disposed along substantially the same meridian plane of the tyre 1.

In the embodiment shown in FIG. 1, three sensor devices 11, 12, and 13 are disposed on the internal surface of the tyre 1, on the inner liner surface. A first sensor device ills disposed substantially at the equatorial plane of the tyre 1. Two other sensor devices 12, 13 are disposed substantially on the same meridian plane of the tyre 1 in shoulder regions of the crown portion T of the tyre 1. Such sensor device disposition allows a monitoring the general behavior of the full interaction area between the tyre and the ground; for instance when the tyre is cornering the signals derived from the two shoulder sensor devices 12 and 13 change relative to each other: this change could be tracked in order to gain information related to a cornering angle of the tyre 1, or for identifying a given maneuver of the vehicle on which the tyre 1 is fitted. Methods disclosed in some of the documents cited in the background of the invention could be exploited in order to derive information related to the behavior of the tyre and/or to the interaction of the tyre with the ground during running of a vehicle.

In order to ensure a good monitoring of the whole interaction area between the tyre and the ground, the sensor devices should be separated from each other of a certain distance. However, with regards to the sensor devices disposed in the shoulder regions, they should be disposed sufficiently far away from the sidewalls, so that they can provide signals in almost every condition of travel. In this respect, it has to be noticed that vehicle regulations, such as for example the camber, in combination with particular maneuvers of the vehicle (e.g. sharp bends) may cause transient partial loss of interaction between shoulder portions of the tread near the sidewall and the ground. Preferably, a shoulder sensor device could be disposed at a distance from the equatorial plane of the tyre comprised between 15% and 30% of the tread width, more preferably between 18% and 28% of the tread width, even more preferably between 20% and 25% of the tread width. For example, in a tyre having a tread width of 195 mm, two shoulder sensor devices may be disposed on opposite sides with respect to the equatorial plane, each at a distance of 45 mm thereof.

Preferably, at least one sensor device is adapted to measure the acceleration of the respective monitored point of the tyre 1 in at least two directions orthogonal to each other. More preferably, all the sensor devices are adapted to measure the acceleration with respect to at least two directions orthogonal to each other. For example, in FIG. 1 the X, Y and Z local axes represent three directions that for the purposes of the present description are named respectively:

centripetal direction Z, which is a radial direction of said tyre, tangential direction Y, which is a direction tangential to the circumference of said tyre, lateral direction X, which is a direction orthogonal to both said centripetal and tangential directions.

Preferred directions for the measurements are the centripetal and the tangential direction.

Figure 2:
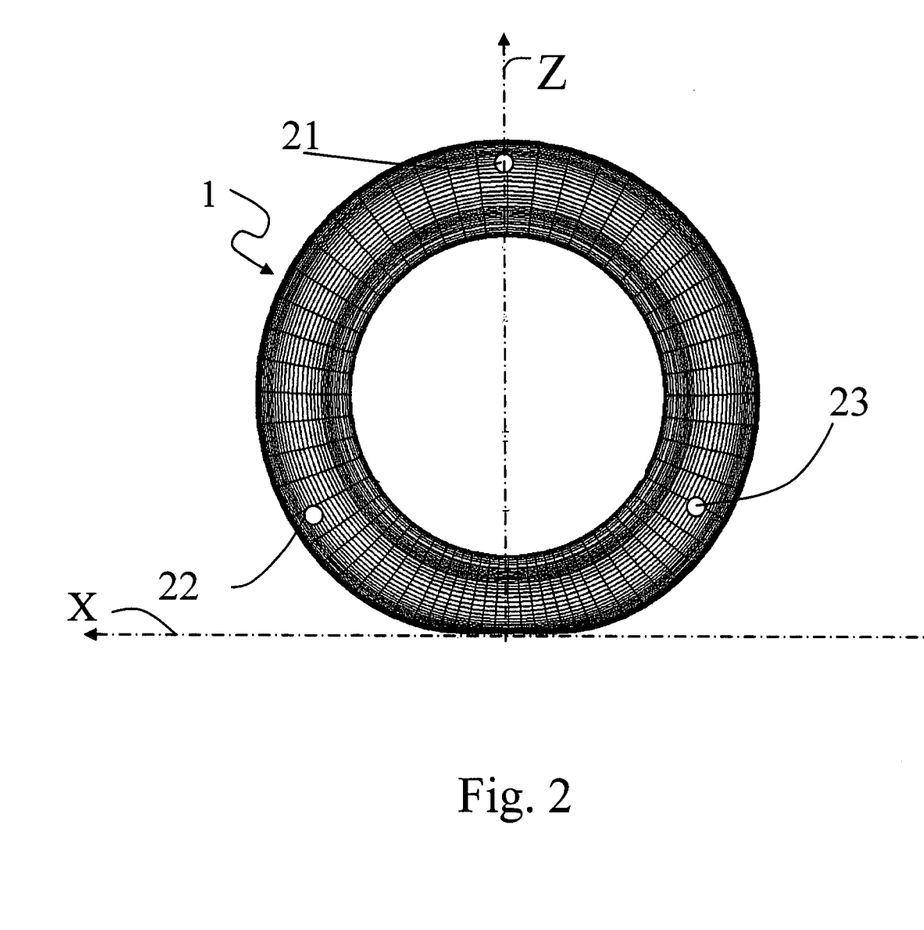
FIG. 2 schematically shows an equatorial section of a tyre having three groups of sensor devices disposed on the liner internal surface, usable in a further preferred embodiment of the present invention.

In FIG. 2 a further embodiment of a tyre usable in the present invention is shown, in which several groups of sensor devices 21, 22, and 23 are associated to a tyre 1. Each group of sensor devices 21, 22, and 23 comprises sensor devices disposed substantially along the same meridian plane of the tyre 1, as disclosed above with reference to FIG. 1. Preferably, the groups of sensor devices are located in a circumferential position spaced one from each other of substantially the same angle. For example, in FIG. 2 three groups of sensor devices are shown, spaced from each other of an angle of substantially 120°. As far as the disposition of the sensor device within each group 21, 22 or 23 in the embodiment of FIG. 2, reference is made to what disclosed above with reference to FIG. 1.

The use of a plurality of groups of sensor devices as shown in FIG. 2 allows the achievement of more accuracy and reliability of the measurements performed by the sensor devices, as well as a better monitoring of the entire wheel turn.

The sensor devices 11, 12, 13 and/or 21, 22, 23, may typically comprise (further to the sensor component) a power supply, preferably a self-generating power device (e.g., a piezoelectric device) generating electrical energy thanks to the deformations subjected by the tyre during rotation and storing the same in an electrical circuit, a processing unit, a transmitter and an antenna connected to the transmitter. A receiver (which is also connected to the antenna), preferably a low-rate, low-power, consuming wake-up radio receiver, is also included in each of the sensor devices.

The sensor devices 11, 12, 13 and/or 21, 22, 23 are in wireless communication with a receiving device, typically including an antenna, a receiver connected to the antenna and a processing unit. The receiving device also comprises a transmitter (which is also connected to the antenna). Such receiving device may be preferably disposed on the vehicle. In preferred embodiments, a respective receiving device is associated to each tyre fitted on a vehicle, for receiving data from and for controlling the transmission of the plurality of sensor devices included therein. Thus, for example, a car could be equipped with four receiving devices, each being in bidirectional communication with the sensor devices included in the associated tyre.

In operation, during running of the tyres the sensor components of the sensor devices perform a measurement, so that an electrical signal is generated and acquired carrying information related to, e.g., the acceleration of the respective points of the tyre to which they are associated. The acquired signals are then wirelessly transmitted by the sensor devices to the associated receiving device, typically by means of radio frequencies. The transmitted signals are typically in form of data packets. In preferred embodiments the acquisition and the transmission operations are performed in different, non-overlapping time intervals, so as to reduce the probability of peak power consumption. Typically, in case of use of a self-powering device for the powering of the sensor devices, the operations of the sensor devices are started when the voltage generated by the self-powering device is above a predefined threshold. As it will be explained in more detail below, the timing of the transmission of the different sensors included in a tyre is controlled by the associated receiving device, which thus acts as a transmission coordinator for the sensor devices included in the associated tyre. In order to set the timing for data transmission, timing information sent from the transmission coordinator is received and processed by the sensor devices.

Each receiving device, or transmission coordinator, receives the signals (or data packets) sent by the sensor devices included in the respective associated tyre. The processing unit included in each transmission coordinator can thus perform the processing needed in order to derive a condition of the associated tyre, e.g. its behavior and/or parameters characterizing the operation of the tyre (load, cornering angle, camber angle, etc.). As stated above and described in detail below, each transmission coordinator also transmits timing information to the sensor devices for controlling the timing of the data transmission from each sensor device included in the respective associated tyre.

By collecting the information from all the tyres, a maneuver (e.g. braking, acceleration, cornering, etc.) being performed by the tyres or by the vehicle can thus be identified. Moreover, a critical condition being reached by the tyres or by the vehicle during such maneuver (for example due to aquaplaning) could also be identified. In such case, an alarm signal could be generated, to cause a counter-action to control the vehicle, e.g. by the driver or by auto-control systems of the vehicle. These "high-level" operations could be performed by a central receiving device or system control host (e.g. implemented in or in communication with the on-board vehicle computer) being in communication with all the transmission coordinators.

As already introduced above, the timing of the transmission of the plurality of sensor devices included in a tyre is controlled by the associated receiving device, which thus acts as a transmission coordinator for the sensor devices included in the associated tyre. More particularly, in order to set the transmission schedule of the plurality of sensor devices, an implicit method is used, in which each sensor device determines its own allocated timeslot for transmission of the acquired data based on timing information sent by the transmission coordinator. Timing information can be sent by the transmission coordinator via a so called "beacon packet", including few data allowing each sensor device to suitably schedule its own operations, particularly the respective transmission timeslot. The suitable operation schedule could be performed by each sensor device based on the received timing information and, possibly, on information stored at each sensor device itself. The implicit method of generating the transmission schedule enables a simplification of the architecture of the sensor devices, since a low-rate wake-up receiver could be used in the sensor devices. Moreover, a remarkable reduction in the power consuming needed for the reception of the timing information can be reached, since long schedule instruction packets are not needed, which is advantageous especially in case of use of self-powering (or energy scavenging) devices for powering the sensor device. In order to gain information useful for vehicle controlling, synchronization with the rotation of the tyre is advantageously implemented, so that the timing information is sent by the transmission coordinator at each rotation of the tyre, and the data packets are also sent by the sensor devices to the transmission coordinator at each rotation of the tyre.

In practice, the sub-system formed by the sensor devices included in a tyre and the associated transmission coordinator is configured as a pico-network, having a coordinator (the transmission coordinator) and multiple nodes (the plurality of sensor devices). In the pico-network, the multiple nodes are independent and do not interact with each other. Moreover, the transmission order of the nodes is known to the coordinator and to the nodes. The ordering can be predetermined and stored both at the coordinator and the nodes. Furthermore, all nodes are allocated the same amount of transmission time. It is also assumed that the differences in time of arrival at plurality of nodes of the beacon packet including timing information sent by the coordinator are negligible as compared with the transmission timeslots.

The following parameters could be exemplarily defined for describing the timing information sent by the transmission coordinator and/or derived/calculated from the sensor devices/nodes of the network:

$T_{slot}$: is the allotted timeslot for one node or sensor device to transmit to the transmission coordinator;

$T_{frame}$: is the time it takes for n nodes to transmit data, i.e. the total time interval formed by the plurality of non-overlapping timeslots of duration $T_{slot}$;

n: is the total number of network nodes, i.e. the total number of sensor devices in one tyre;

$T_{tx0}$: is the total transmission time allocated by the transmission coordinator (including possible retransmissions) for the network in a given transmission cycle;

$T_{tx}$: is the remaining time in a given transmission cycle;

The communication protocol between the nodes or sensor devices included in the tyre and the associated transmission coordinator may comprise an initialization phase in which one of the sensor devices, being designated as "master" node, sends one or more beacon-request packet(s) to the transmission coordinator. This beacon request may correspond to a readiness condition reached by the sensor devices for the transmission of data. For example, this readiness condition could correspond to the fact that a sufficient level of power is stored in an electrical circuit associated with an energy scavenging component included in the sensor devices, which typically occurs after a certain number of tyre rotations. The beacon-request packet(s) advantageously comprise(s) information related to the current rotation speed of the tyre (and, possibly, the rotation angle at which the sensor device is located), acquired by a sensor component included in the master sensor device. For example, such information could be an acceleration curve sensed and acquired by the sensor device, from which the rotation speed (and, possibly, the rotation angle at which the sensor device is located) could be derived.

In the initialization phase, the transmission coordinator receives the beacon-request packet(s) and derives the current rotation speed of the tyre (and, possibly, the rotation angle at which the master sensor device is located). Based on the derived information, the transmission coordinator can calculate how much time to allocate for the transmission of all the sensor devices/nodes of the network. The maximum time allowed for the transmission of data by all the sensor devices may preferably be set as being lower than the time required for an entire tyre rotation, more preferably lower than a half of the time required for an entire tyre rotation. This allows maintaining synchronization of the data transmission with the rotation of the tyre, which is advantageous for monitoring in a very precise and substantially continuous way the interaction between the tyre and the ground during rotation.

The transmission coordinator then generates a beacon packet carrying timing information needed for the calculation, at the sensor devices, of the respective transmission timeslots. For example, the following information could be included in the beacon packet:

Total network data transmission time ($T_{tx0}$);
Time left for transmission ($T_{tx}$);
Number of nodes/sensor devices currently present in the network (n).

The number of nodes/sensor devices could also be permanently stored at each node/sensor device, so that the transmission coordinator could be programmed for sending only timing information. In a preferred embodiment, additional information related to a time interval to be reserved within $T_{tx0}$ for lost packet retransmissions could be provided in the beacon packet. For example, data related to a certain percentage of $T_{tx0}$ (e.g. 10%) could be included in the beacon packet sent by the transmission coordinator. However, it has to be understood that also this data could be permanently stored at each node/sensor device.

The beacon packet comprising timing information could be retransmitted periodically (e.g. at the start of each frame) until the transmission coordinator has received valid data packets from all the nodes/sensor devices included within the associated tyre. These valid data packets could be acknowledgement beacons sent by the nodes/sensor devices, or, preferably, the actual data acquired by the nodes/sensor devices during rotation of the tyre and transmitted to the transmission coordinator. At each retransmission of the beacon carrying timing information performed by the transmission coordinator, the time left for transmission $T_{tx}$ is updated.

In preferred embodiments, the beacon packet(s) comprising timing information is (are) sent by the transmission coordinator at every turn of the tyre. The timing for a subsequent beacon transmission could be derived by the transmission coordinator based on the data acquired and transmitted by the sensor devices, from which the transmission coordinator could derive the rotation speed of the tyre.

The communication protocol between the nodes or sensor devices included in the tyre and the associated transmission coordinator then comprises the transmission phase, in which the nodes/sensor devices perform all the operations needed for setting up the scheduling of the data transmission based on the timing information received from the transmission coordinator.

In particular, upon receiving the beacon packet comprising timing information sent by the transmission coordinator, each node preferably turns off the respective receiver, so as to save power. In addition, it estimates when to turn on the receiver again to listen to the beacon of the next transmission cycle. For example, the receiver of each node/sensor device could be turned on after the respective data transmission, or at the end of the total network data transmission time $T_{tx0}$, or, in case of activation of a retransmission mechanism for lost data packets, at the estimated time for the beginning of the retransmission time interval.

Moreover, each node/sensor device uses the parameters $T_{tx}$, $T_{tx0}$, n received via the beacon packet sent by the transmission coordinator and/or stored in a memory of the node/sensor device itself, to implicitly generate a TDMA (Time Division Multiple Access) scheduling for data transmission, formed by a plurality of non-overlapping transmission timeslots. More particularly, considering three nodes/sensor devices included in a tyre and located on the same meridian plane as in the exemplary tyre embodiment of FIG. 1, each node/sensor device could be associated with an order number $a_1=1$, $a_2=2$, $a_3=3$. Based on the order number and the timing information from the beacon packet, each node/sensor device is able to calculate its assigned transmission timeslot.

For example, each node/sensor device can be adapted to determine the duration $T_{slot}$ of the time interval for transmission by using the parameter $T_{tx}$, i.e. the time left for transmission, as being equal to the useful frame for transmission (see parameter $T_{frame}$ above), and simply dividing $T_{tx}$, for the number n of nodes/sensor devices. In other cases, the duration $T_{frame}$ useful for data transmission (and to be divided by the number n of nodes/sensor devices in order to determine $T_{slot}$) could be derived by subtracting to $T_{fx}$ time intervals required by the communication protocol, such as for example time intervals for retransmissions, and/or time intervals for data acquisition. In still other examples, the communication protocol may set a plurality of frames for each data transmission, so that each node/sensor device is assigned a corresponding plurality of transmission timeslots. In any case, once the parameter $T_{slot}$ is determined, a time parameter $T_{wait\_initial}$ could be derived by each of the nodes/sensor devices using the above mentioned order numbers and the simple formula $(T_{wait\_initial})_i = (a_i-1)*T_{slot}$. For each node/sensor device i, the calculated parameter $(T_{wait\_initial})_i$ corresponds to the time that the node/sensor device should wait before data transmission to the transmission coordinator, corresponding to the TDMA scheduling. Data transmission is then performed by each node/sensor device in the respective assigned transmission timeslot (or timeslots, if a plurality of transmission frames is set). The transmitted data packets are labeled with an identifier associated with each node/sensor device. After completion of data transmission, each node/sensor device comes back in an operative mode in which it could acquire/process the next data to be transmitted, and/or activate its receiver for listening beacons from the transmission coordinator for the next transmission cycle, to be preferably performed at the successive tyre turn.

This implicit scheduling mechanism has the advantage of avoiding receiving complex scheduling instructions from the transmission coordinator at each node/sensor device, thus saving listening power. Moreover, the TDMA scheduling has the additional advantage of strongly reducing (or even nullifying) the probability of collisions between data packets sent by different nodes/sensor devices, so as to reduce or even avoid the need of retransmissions. This further reduces the power consumption needed at each node/sensor device for enabling correct data reception at the transmission coordinator.

Example 1

Figure 3:
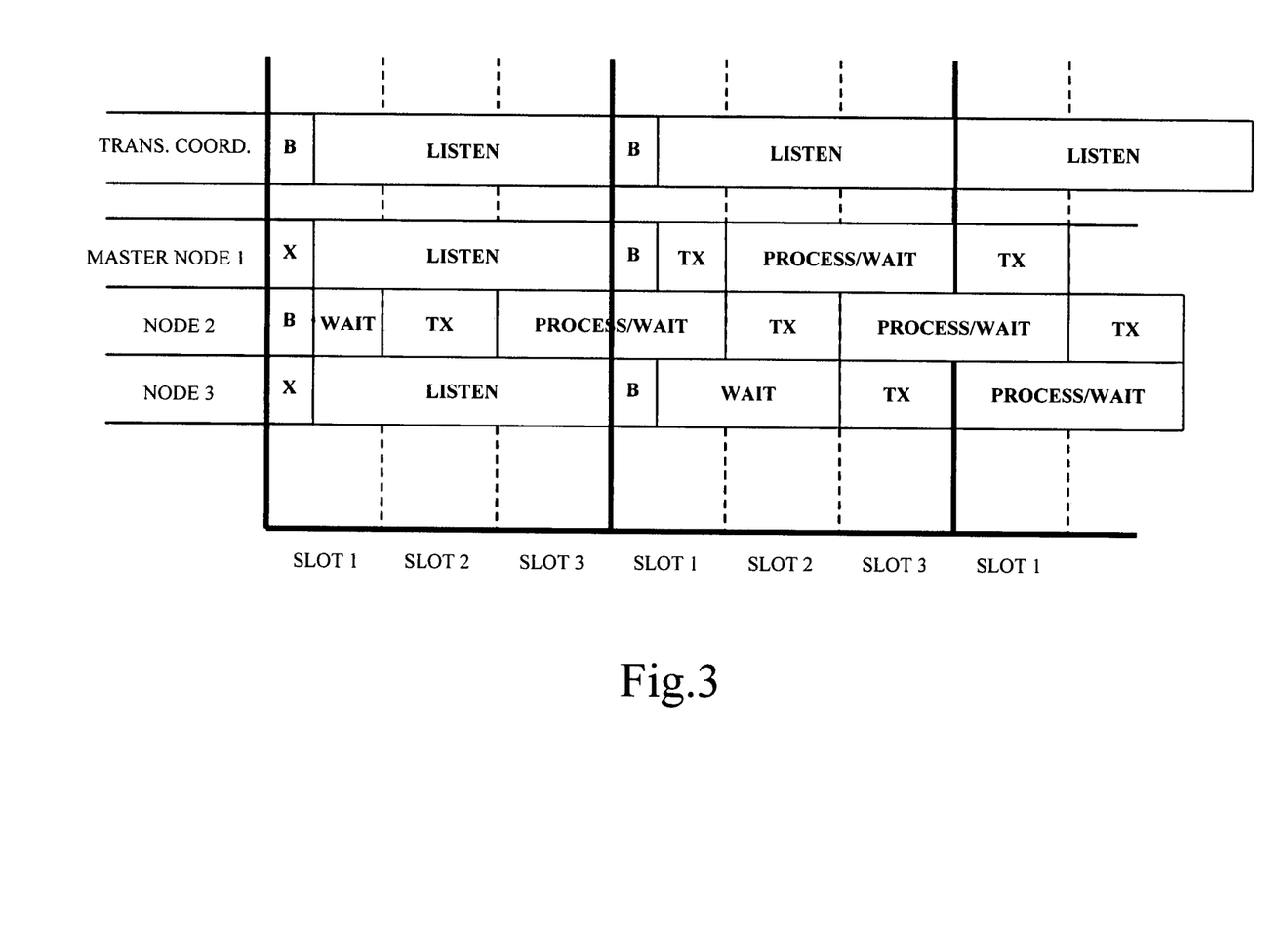
FIG. 3 shows a first exemplary sequence of time frames for the coordinated data transmission of three nodes/sensor devices located on the same meridian plane of a tyre.

FIG. 3 shows a first exemplary sequence of time frames for the coordinated data transmission of three nodes/sensor devices located on the same meridian plane of a tyre. It is assumed that a beacon (represented by "B" in FIG. 3) including timing information is sent by a transmission coordinator associated to the three nodes/sensor devices at the beginning of a time window provided for data transmission. It is also assumed that data acquisition is performed in a different time window.

As shown by FIG. 3, the transmission coordinator sends a first beacon with timing information. The first beacon is correctly received by Node 2, but not received by Node 1 (designated as Master Node) and by Node 3 (as represented by the two "X"s in the first frame of FIG. 3). Thus, the transmission coordinator, the Node 1 and the Node 3 remain in a wait/listen mode for all the first frame, while the Node 2 calculates and waits for its assigned timeslot in the first frame, in which it transmits a first data packet. After transmission of the first data packet, the Node 2 enters in a process/wait status, in which it processes the next data packet to be transmitted in the next assigned timeslot. In this operative mode, the receiver of Node 2 is switched off.

At the beginning of the second frame, another beacon is sent by the transmission coordinator (with updated timing parameters), since the latter did not receive data from all the nodes/sensor devices. This second beacon is lost by Node 2, which has its receiver switched off: however, Node 2 already possesses all the information needed for its own transmission scheduling, since it received the first beacon with the timing information. On the other hand, Master Node 1 and Node 3 have their receiver switched on, and correctly receive the beacon with timing information. Based on the received timing information, both Master Node 1 and Node 3 calculate their assigned transmission timeslots. In particular, Master Node 1 immediately transmits a first data packet, whereas Node 3 waits for its assigned timeslot and then transmits its first data packet. Both Master Node 1 and Node 3 then enter in a process/wait status, in which they keep their receiver switched off. Between the transmissions of Master Node 1 and Node 3, Node 2 transmits its second data packet, according to the TDMA scheduling.

Since after the second frame the transmission coordinator received data packets from all the nodes/sensor devices included in the associated tyre, no more beacons comprising timing information are sent in the subsequent frames. Then, data transmission goes on according to the TDMA scheduling in the subsequent frames, up to the end of the transmission window.

Example 2

Figure 4:
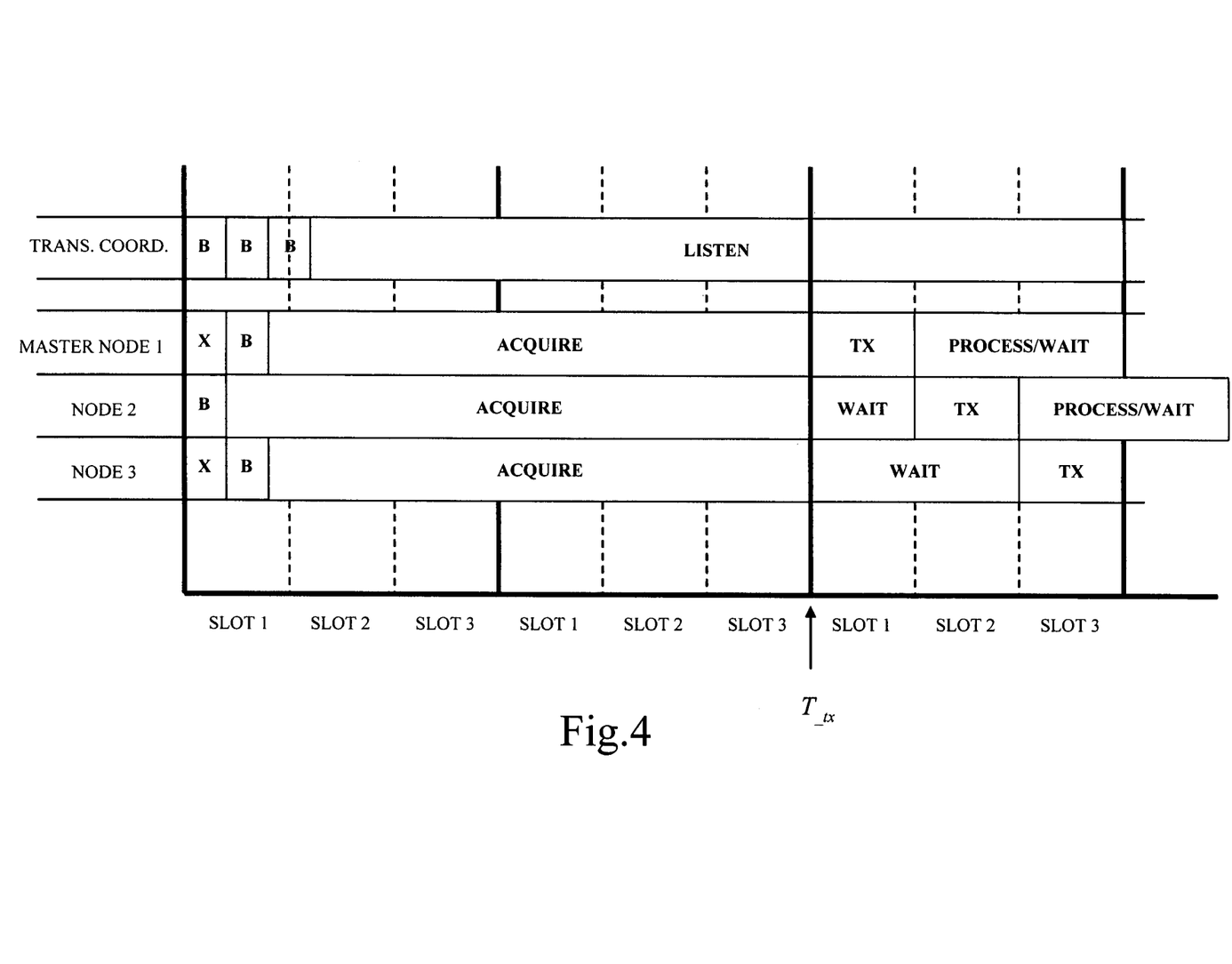
FIG. 4 shows a second exemplary sequence of time frames for the coordinated data transmission of three nodes/sensor devices located on the same meridian plane of a tyre.

FIG. 4 shows a second exemplary sequence of time frames for the coordinated data transmission of three nodes/sensor devices located on the same meridian plane of a tyre. It is assumed that a beacon (represented by "B" in FIG. 4) including timing information is sent three times by a transmission coordinator associated to the three nodes/sensor devices at the beginning of a time window provided for data acquisition. It is also assumed that data transmission is performed after the end of data acquisition.

The timing of the start of the transmission window could be dictated by a suitable parameter $T_{\_tx}$ included in the beacon. The beacon including timing information is sent three times in sequence by the transmission coordinator in order to reduce (or even nullify) the probability of non-reception of the beacon by the nodes/sensor devices. In this exemplary communication protocol, in fact, the transmission coordinator does not have an acknowledgement of the reception of the beacon by the nodes/sensor devices (which is advantageous, even if not mandatory, in order to save power consumption).

As shown by FIG. 4, all the Nodes receive the beacon including timing information. Consequently, they switch off their receiver and begin to acquire the data to be transmitted in the following transmission time window. The Nodes also calculate the assigned timeslots for subsequent data transmission. Then, when the start of the transmission window occurs (represented by $T_{\_tx}$ in FIG. 4), each Node (the Master Node 1 first, then the Node 2, and then Node 3) transmits data packets in the respective assigned timeslot, in each frame of the transmission window.

Example 3

Figure 5:
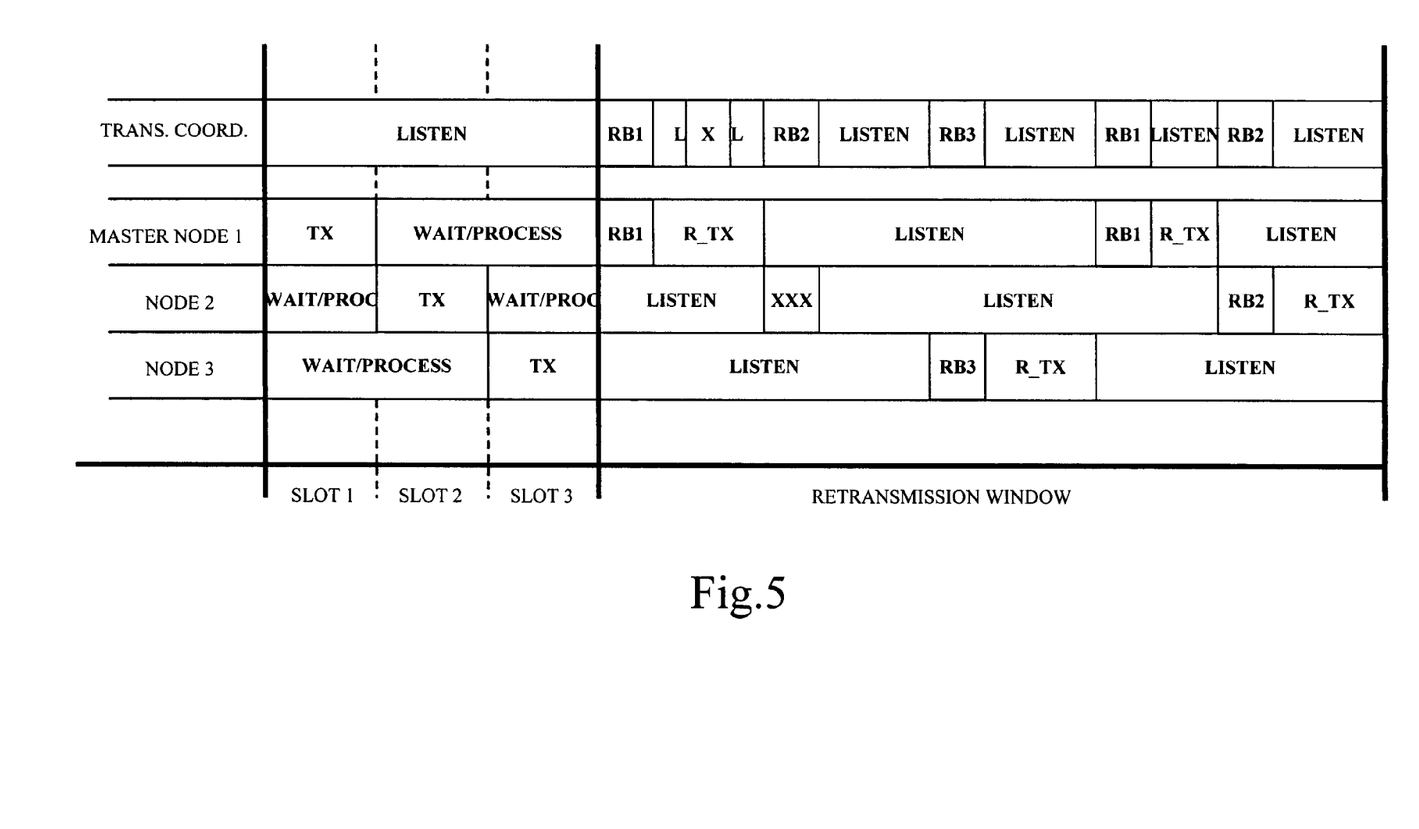
FIG. 5 shows a third exemplary sequence of time frames for the retransmission of lost data packets transmitted by three nodes/sensor devices located on the same meridian plane of the tyre.

FIG. 5 shows a third exemplary sequence of time frames for the retransmission of lost data packets transmitted by three nodes/sensor devices located on the same meridian plane of the tyre. It is assumed that the communication protocol provides for a retransmission window at the end of the transmission window. For example, such retransmission window could last 10% of the transmission window. The timing information for enabling the nodes/sensor devices to correctly set the retransmission window could be sent in the beacon sent by the transmission coordinator or permanently stored in the memory of the nodes/sensor devices. However, differently from the transmissions of the data packets, retransmissions do not follow a TDMA schedule, but are performed by the nodes/sensor devices on request received by the transmission coordinator.

It is assumed that at the end of the transmission window each node/sensor device switches on its respective receiver for listening for possible retransmission request beacons coming from the associated transmission coordinator. Preferably, during listening operation, each node/sensor device switches off its respective transmitter.

It is also assumed that the transmission coordinator sends the retransmission request beacons by addressing them to the nodes, using the respective identifiers.

With reference to the exemplary sequence of FIG. 5, at the end of the transmission window the transmission coordinator sends a retransmission request beacon addressed to (i.e. labeled with the identifier of) Master Node 1 (RB1) requesting retransmission of some lost data packets, and switches to a listen status for receiving the packet(s) retransmitted by Master Node 1 (R_TX). Master Node 1 receives the retransmission request beacon RB1 addressed to it and retransmits the lost data packets dictated by the retransmission request beacon. As shown in FIG. 5, during retransmission, another missing reception occurs at the transmission coordinator (indicated by X in FIG. 5). After the retransmission, Master Node 1 switches off its transmitter and switches on its receiver for listening to further retransmission request beacons.

After the completion of the retransmission of Master Node 1, the transmission coordinator sends a retransmission request beacon addressed to (i.e. labeled with the identifier of) Node 2 (RB2). Node 2, which is listening to possible retransmission requests coming from the transmission coordinator, misses the retransmission request beacon RB2 (as indicated by XXX in FIG. 5), and continues listening.

After a predetermined elapsed time, the transmission coordinator sends a retransmission request beacon addressed to (i.e. labeled with the identifier of) Node 3 (RB3). Node 3, which is listening to possible retransmission requests coming from the transmission coordinator, receives the retransmission request beacon RB3 addressed to it and retransmits the lost data packets dictated by the retransmission request beacon. After the retransmission, Node 3 switches off its transmitter and switches on its receiver for listening to further retransmission request beacons.

After the completion of the retransmission of Node 3, the transmission coordinator sends another retransmission request beacon addressed to (i.e. labeled with the identifier of) Master Node 1 (RB1), requesting retransmission of the previously missed retransmitted packet. Master Node 1 receives the retransmission request beacon RB1 addressed to it and retransmits the lost data packets dictated by the retransmission request beacon.

After the completion of the retransmission of Master Node 1, the transmission coordinator sends another retransmission request beacon addressed to (i.e. labeled with the identifier of) Node 2 (RB2). Node 2, which is listening to possible retransmission requests coming from the transmission coordinator, receives the retransmission request beacon RB2 addressed to it and retransmits the lost data packets dictated by the retransmission request beacon.

The retransmission phase continues until either all lost data packets are successfully received at the transmission coordinator or the end of transmission window is reached.

The present invention has been described considering some possible embodiments thereof. Those skilled in the art will readily recognize that several modifications to the described embodiments are possible, as well as other embodiments, all falling within the scope of the appended claims.

For example, although the description has been carried out with particular reference to transmission from a single tyre, transmission from different tyres is also encompassed by the present invention. Exemplarily, transmission from sensor devices included in different tyres could be carried out by exploiting CDMA (Code Division Multiple Access) for separating the different signals, or also FDMA (Frequency Division Multiple Access).

Moreover, transmission from different groups of sensor devices included in a single tyre as in the embodiment shown in FIG. 2 could be carried out by designated one sensor device in each group as being the master node/sensor device of the group. This master node may initiate transmission of beacons on behalf of its group when it is ready to operate, so that the transmission coordinator could at least approximately gain information on the location in the tyre of each group. The number of groups may determine the maximum allowed time interval for each group of sensor devices, and each group of sensor devices may practically have the same transmission TDMA structure (in particular if the number of sensor devices is equal in all groups). In preferred embodiments, TDMA structure is accomplished so as no overlap is provided between the transmission intervals assigned to each group of sensor devices. Clearly, the TDMA structure should provide timeslots of enough time for allowing each sensor device included in the tyre to transmit at least one data packet to the transmission coordinator.

The invention claimed is:

1. A method for managing transmission of data from a plurality of sensor devices in a tyre fitted on a vehicle, comprising:
   providing said plurality of sensor devices at predefined respective positions in said tyre;
   providing a transmission coordinator on said vehicle, outside of said tyre;
   rotating said tyre and having said plurality of sensor devices obtaining data related to a condition of said tyre during rotation thereof; and
   causing said plurality of sensor devices to wirelessly transmit the obtained data,
wherein causing said plurality of sensor devices to wirelessly transmit said obtained data comprises:
   sending timing information from said transmission coordinator, said timing information being at least related to a maximum allowed time interval for transmission of obtained data from said plurality of sensor devices;
   at each sensor device of said plurality of sensor devices, receiving said timing information and calculating at least one respective transmission timeslot for the transmission of the obtained data within said maximum allowed time interval, so as to obtain a respective plurality of non-overlapping transmission timeslots; and
   at each sensor device of the plurality of sensor devices, waiting for respective calculated at least one transmission timeslot and wirelessly transmitting the obtained data within the respective calculated at least one transmission timeslot.

2. The method according to claim 1, wherein said maximum allowed time interval is at most equal to a time interval required for one complete revolution of said tyre.

3. The method according to claim 2, wherein said maximum allowed time interval is at most equal to a half of said time interval required for one complete revolution of said tyre.

4. The method according to claim 1, further comprising sending idle information from at least one master sensor device of the plurality of sensor devices, wherein said idle information is related to a readiness of said plurality of sensor devices to receive said timing information, and wherein said sending of timing information from said transmission coordinator is performed consequently of a reception of said idle information by said transmission coordinator.

5. The method according to claim 1, wherein each sensor device of said plurality of sensor devices comprises an electrical circuit capable of being adapted to store electrical energy generated in consequence of the rotation of the tyre.

6. The method according to claim 5, further comprising sending idle information from at least one master sensor device of the plurality of sensor devices, wherein said idle information is related to a readiness of said plurality of sensor devices to receive said timing information, and wherein said sending of timing information from said transmission coordinator is performed consequently of a reception of said idle information by said transmission coordinator, wherein said sending of idle information is performed by the at least one master sensor device when a voltage across its respective electrical circuit is higher than a predetermined threshold.

7. The method according to claim 1, wherein said timing information sent by said transmission coordinator is further related to a maximum allowed acquisition time interval for acquisition of data related to a condition of said tyre by the plurality of sensor devices.

8. The method according to claim 7, wherein said maximum allowed acquisition time interval and a plurality of non-overlapping calculated transmission timeslots do not overlap with each other.

9. The method according to claim 1, further comprising receiving, at said transmission coordinator, the obtained data transmitted from said plurality of sensor devices, and processing said data so as to derive a condition of said tyre.

10. The method according to claim 9, wherein, in case of missed reception of at least one data portion transmitted from at least one sensor device, further comprising having the transmission coordinator addressing a retransmission request of said data portion to said at least one sensor device.

11. The method according to claim 10, further comprising retransmitting said data portion by said at least one sensor device consequently of a reception thereof of said retransmission request, said retransmitting being performed within said maximum allowed time interval.

12. The method according to claim 11, wherein said retransmitting is performed by said at least one sensor device within a respective retransmission timeslot calculated by said at least one sensor device based on said timing information, and wherein said calculated respective retransmission timeslot and said plurality of non-overlapping transmission timeslots do not overlap with each other.

13. The method according to claim 11, wherein providing said plurality of sensor devices at predefined respective positions in said tyre comprises disposing at least two sensor devices substantially at a same meridian plane of the tyre.

14. A system for monitoring a tyre fitted on a vehicle comprising:
a plurality of sensor devices capable of being adapted to obtain data related to a condition of said tyre during rotation thereof and to wirelessly transmit obtained data outside of said tyre; and
a transmission coordinator capable of being adapted to receive said obtained data transmitted by said plurality of sensor devices, wherein
said transmission coordinator is further capable of being adapted to send timing information to said plurality of sensor devices, said timing information being at least related to a maximum allowed time interval for the transmission of the obtained data from said plurality of sensor devices;
each sensor device of said plurality of sensor devices is further capable of being adapted to receive said timing information and calculate at least one respective transmission timeslot for the transmission of the obtained data within said maximum allowed time interval, so as to obtain a respective plurality of non-overlapping transmission timeslots; and
each sensor device of the plurality of sensor devices is further capable of being adapted to wait for a respective calculated at least one transmission timeslot and to wirelessly transmit the obtained data within the respective calculated at least one transmission timeslot.

15. The system according to claim 14, wherein said maximum allowed time interval is at most equal to a time interval required for one complete revolution of said tyre.

16. The system according to claim 15, wherein said maximum allowed time interval is at most equal to a half of said time interval required for one complete revolution of said tyre.

17. The system according to claim 14, wherein at least one master sensor device is further capable of being adapted to send idle information, said idle information being related to a readiness of said plurality of sensor devices to receive said timing information, and wherein said transmission coordinator is further capable of being adapted to send said timing information consequently of a reception of said idle information.

18. The system according to claim 14, wherein each sensor device of said plurality of sensor devices comprises an electrical circuit capable of being adapted to store electrical energy generated in consequence of the rotation of the tyre.

19. The system according to claim 18, wherein at least one master sensor device is further capable of being adapted to send idle information, said idle information being related to a readiness of said plurality of sensor devices to receive said timing information, and wherein said transmission coordinator is further capable of being adapted to send said timing information consequently of a reception of said idle information, and wherein at least one master sensor device is capable of being adapted to send said idle information when a voltage across a respective electrical circuit thereof is higher than a predetermined threshold.

20. The system according to claim 14, wherein said timing information is further related to a maximum allowed acquisition time interval for the acquisition of data related to a condition of said tyre by the plurality of sensor devices.

21. The system according to claim 20, wherein said maximum allowed acquisition time interval and a plurality of non-overlapping calculated transmission timeslots do not overlap with each other.

22. The system according to claim 14, wherein said transmission coordinator is further capable of being adapted to process said data so as to derive a condition of said tyre.

23. The system according to claim 22, wherein the transmission coordinator is further capable of being adapted to address a retransmission request of at least one data portion to at least one sensor device in case of missed reception of said at least one data portion transmitted from at least one sensor device.

24. The system according to claim 23, wherein said at least one sensor device is further capable of being adapted to retransmit said at least one data portion in consequence of a reception of said retransmission request, said retransmitting being performed within said maximum allowed time interval.

25. The system according to claim 24, wherein said at least one sensor device is further capable of being adapted to calculate a respective retransmission timeslot based on said timing information and to retransmit said at least one data portion within said respective calculated retransmission timeslot, and wherein said calculated respective retransmission timeslot and said plurality of non-overlapping transmission timeslots do not overlap with each other.

26. The system according to claim 14, wherein said plurality of sensor devices comprises at least two sensor devices disposed substantially at a same meridian plane of the tyre.

27. The system according to claim 14, wherein each sensor device of said plurality of sensor devices comprises an accelerometer.

28. The system according to claim 27, wherein said accelerometer is capable of being adapted to measure acceleration in at least two directions or three directions.

29. The system according to claim 14, wherein each sensor device of said plurality of sensor devices is fixed to an inner surface of the tyre.

\* \* \* \* \*